United States Patent [19]
Smith

[11] Patent Number: 5,773,531
[45] Date of Patent: Jun. 30, 1998

[54] UNSATURATED POLYESTER RESIN COMPOSITION

[75] Inventor: Stuart B. Smith, Conyers, Ga.

[73] Assignee: Hehr International Inc., Conyers, Ga.

[21] Appl. No.: 920,697

[22] Filed: Aug. 29, 1997

Related U.S. Application Data

[62] Division of Ser. No. 629,894, Apr. 10, 1996.

[51] Int. Cl.$^6$ ........................................... C08F 20/00
[52] U.S. Cl. ............................ 525/445; 528/65; 528/66; 528/75; 528/80; 528/83; 528/272; 528/306; 525/11; 525/13; 525/17; 525/28; 525/43; 525/437; 525/440; 525/445; 525/447; 524/174; 524/356; 524/442; 522/24; 522/29; 522/33; 522/39
[58] Field of Search ................................ 528/272, 306, 528/65, 66, 75, 80, 83; 525/11, 13, 17, 28, 43, 437, 440, 445, 447; 522/24, 29, 33, 39; 524/174, 356, 442

[56] References Cited

U.S. PATENT DOCUMENTS

| | | | |
|---|---|---|---|
| 3,882,189 | 5/1975 | Hudak | 525/520 |
| 4,192,762 | 3/1980 | Osborn | 252/182 |
| 4,834,933 | 5/1989 | Gardner et al. | 264/257 |
| 5,006,413 | 4/1991 | Den Hartog et al. | 428/463 |
| 5,153,246 | 10/1992 | Michaels et al. | 524/101 |
| 5,599,877 | 2/1997 | Wang et al. | 525/146 |

*Primary Examiner*—Samuel A. Acquah
*Attorney, Agent, or Firm*—Richard P. Crowley

[57] ABSTRACT

A modified acrylic urethane prepolymer composition and an unsaturated polyester resin composition to which the prepolymer has been added. The prepolymer composition includes an acrylic urethane prepolymer prepared by the reaction of diisocyanate, like MDI, with an hydroxyl-containing acrylate monomer, such as a pentaerythritol triacrylate, which prepolymer composition may contain a styrene monomer and an inhibitor, such as benzoquinone, to retard the reaction of the prepolymer and styrene monomer prior to the addition of the prepolymer composition into the polyester resin composition. The employment of the modified urethane prepolymer composition provides for the reduction in the amount of styrene monomer used in the unsaturated resin composition and also provides for improved chemical and physical properties of the cured, unsaturated resin composition, such as a reduction in glass roll-out when the resin composition is employed with fiberglass.

18 Claims, No Drawings

UNSATURATED POLYESTER RESIN COMPOSITION

This is a divisional of copending application(s) Ser. No. 08/629,894, filed on Apr. 10, 1996.

BACKGROUND OF THE INVENTION

Polyester resins are polycondensation products of a dicarboxylic acid with dihydroxy alcohols. Such polyester resins catalyze to cure or harden, generally at room temperatures, to make a wide variety of products. Unsaturated polyester resins are widely used today to make products for use in the marine, transportation and building industries, and in particular, fiber or particulate reinforced products, such as glass fiber reinforced laminate-type products. Unsaturated polyester resins generally contain ethylenic unsaturation introduced by the employment of unsaturated diacids, thus comprising thermosetting-type resins. As such, unsaturated resins generally employ maleic and fumaric unsaturated acids, although saturated acids, phthalic and adipic acid may also be included to control or reduce the amount of unsaturation in the final unsaturated polyester resin and to control the physical properties. Dihydroxy alcohols most generally used are typically ethylene, propylene, di-ethylene and dipropylene glycols. Cross linking agents may be employed with the unsaturated polyester resins. Generally, styrene monomers and di-allyl phthalate are the most common cross linking agents. The styrene monomers are used to reduce the viscosity of the polyester resin and to act also as a cross linker in the polyester resins.

It is desirable, particularly in view of the toxicity of the styrene monomer and government regulations, to reduce the concentration levels of the styrene monomer from the usual 40% to 50% by weight of the polyester resin to below 35% or 30% by weight. However, reductions in styrene monomer concentrations present problems in the polyester resins with the increased viscosity of the resin causing difficulties in applying the resins, such as causing spray problems and glass roll-out when the resin is sprayed or used in conjunction with glass fibers. The reduced styrene monomer polyester resin does not wet the glass in preparing glass fiber laminates, and therefore, the surface of the sprayed glass fiber polyester resin typically must be contacted with a roller to prevent glass fibers from sticking out of the surface. In addition, the physical properties of the styrene monomer-reduced polyester resins are also greatly reduced without the use of additional, supplemental cross linkers in the polyester resin. The aromatic nature of styrene monomers in the unsaturated polyols improves the hydrolytic stability and increases the chemical resistance to water, detergents and corrosion in the final, cured polyester resin product.

Acrylic monomers, such as methyl methacrylate (MMA) have been added to low or reduced styrene monomer polyester resins for marine grade gel coats and for outdoor applications. However, and unfortunately, MMA has a strong odor, is a skin and eye irritant and results in a slowing of the cure rate of a polyester resin. However, such acrylic monomers usually improve UV, water and chemical resistance. Therefore, it is not desirable to substitute MMA monomer for the styrene monomer or to add it with the styrene monomer, since MMA is also a hazardous material.

It is therefore desirable to provide new and improved, cross linkable diluent compositions to replace or reduce styrene monomer in unsaturated resins, to provide unsaturated, cured resins with better physical and chemical properties and to provide an unsaturated polyester resin composition having reduced styrene monomer therein.

SUMMARY OF THE INVENTION

The invention relates to a modified acrylic urethane prepolymer concentrate for use with unsaturated polyester resins and to the unsaturated polyester resin compositions containing the concentrate as a diluent and a cross linking composition and to the cured unsaturated polyester resin compositions and their uses in the method of preparing laminates and resin products.

The invention concerns an improved, liquid modified acrylic urethane prepolymer concentrate adapted for addition to unsaturated polyester resin compositions to provide improved cured resin properties and to provide unsaturated polyester resin compositions of reduced styrene monomer content. The liquid concentration comprises a modified acrylic urethane prepolymer or oligomer prepared by the reaction of a polyisocyanate, such as an aromatic isocyanate, like MDI, or an aliphatic isocyanate, usually in a stoichiometric amount or in a slight excess, with an hydroxyl-containing acrylate monomer with or without the presence of a catalyst and a diluent monomer, like a styrene monomer, generally in an amount of less than 40% by weight of the unsaturated polyester resin composition to which the concentrate is added, and an inhibitor, such as quinone compound, such as benzoquinone, to retard any prereaction of the prepolymer and the styrene monomer in the concentrate.

The invention is also concerned with unsaturated resin compositions subject to curing in the presence of a catalyst, typically a peroxide alone or with a metal promoter, like a metal carboxylate, such as a cobalt or copper salt, alone or in combination with various accelerators, which are amine or amide accelerators. The catalytic amount of the peroxide compound added just prior to use of the resin composition is usually accompanied with or the resin composition contains a promoting amount of a metal promoter salt at room temperatures in order to provide sufficient exothermic heat to cure of the unsaturated polyester resin composition containing the concentrate. An unsaturated polyester resin composition is usually employed either alone or typically in conjunction with filler material, such as particles or fiber materials, like clay, quartz, sand, limestone, mica, pigments or fibers, like glass fibers, or combinations in amounts of about 0% to 30% by weight of the resin in order to prepare cured laminates of the unsaturated polyester resin, such as a spray laminate, containing glass fibers admixed with the polyester resin.

It has been discovered that the replacement or reduction in amount of a styrene monomer as a diluent and cross linking additive to unsaturated polyester resin compositions may be accomplished by employment of modified acrylic urethane prepolymers which result in improved properties to the cured polyester, better handling in preparing laminates as regards roll-out of the laminate and permits reduction of the styrene monomer, typically to amounts lower than 40%, for example from 0% to 30% by weight of the polyester resin composition. Particularly, it has been discovered that higher functionality acrylic monomers improve the polyester properties of the cured polyester composition. When a polyisocyanate, like MDI, is added to unsaturated polyester resin compositions by itself, such MDI tends to react with the hydroxyl group unsaturated polyester resin composition leading to increased and high viscosity which greatly reduces the feasibility of employing the unsaturated polyester resin composition as a diluent additive. Employment of a MMA monomer itself provides certain disadvantages. Therefore, the employment of a modified acrylic urethane prepolymer, a liquid concentrate, either alone or together with a styrene monomer and an inhibitor, may be used as a diluent additive to unsaturated polyester resin compositions to improve properties and to prepare compositions of reduced styrene monomer content.

In particular, it has been discovered that the high functionality aliphatic urethane prepolymers provide for a variety of improved cure properties of a polyester resin as set forth, for example, in Table I.

TABLE I

| Properties | Mono | Di | Tri | Tetra | Penta |
|---|---|---|---|---|---|
| Cure Speed | Slow → → → → → → → → → → → → → → → Fast |
| Flexibility | High ← ← ← ← ← ← ← ← ← ← ← ← ← ← ← Low |
| Hardness | Low → → → → → → → → → → → → → → → High |
| Solvent Resistance | Low → → → → → → → → → → → → → → → High |
| Crosslink Density | Low → → → → → → → → → → → → → → → High |

The employment of a special hydroxyl containing high functionality acrylic monomer, that is, an acrylic monomer with hydroxyl groups, being made into a prepolymer by the employment of a polyisocyanate, either aromatic or aliphatic diisocyanate, and which prepolymer so prepared in a preferred embodiment, remains in a liquid condition. This liquid concentrate can be added to the low level styrene monomer unsaturated polyester resin compositions and produce a stable polyester resin composition, which does not react unless and until the peroxide catalysts or a catalyst-accelerator promoter combination is added to the unsaturated polyester resin composition. The addition of the catalytic curing composition, such as the use of methyl ethyl ketone peroxide as one example, provides for rapid cure of the polyester without significant loss of unreacted styrene monomer, so that the resulting unsaturated polyester resin with the liquid concentrate wets glass fiber with excellent efficiency and significantly reduces the need to roll-out the glass, where the unsaturated polyester resin composition is sprayed with glass fibers to form a glass fiber reinforced laminate.

The concentrate includes in one example an hydroxyl alkyl, such $C_2$—$C_6$ acrylic monomer which is reacted with a diisocyanate to provide the modified acrylic urethane prepolymer for use in the concentrate. Low functionality acrylic monomers, while not the preferred embodiment, provide for improved cure, chemical and physical properties of the polyester resin, since such low functionality modified acrylic urethane prepolymers with the low functionality used therein provide for solidified prepolymers or prepolymers which rapidly gel, and a liquid concentrate is the preferred embodiment. Some representative types of the acrylic monomers useful in the invention would include 2-hydroxy ethyl acrylate; hydroxy propyl acrylate; 2-hydroxy ethyl methacrylate; 2-hydroxy ethyl propyl methacrylate; and acrylic urethane prepolymers made from having an 100 index down to a 20 index with solidification occurring in most prepolymers, except for the prepolymers having a 20 or below index.

A preferred acrylic polymer which provides for a liquid concentrate comprises a pentaerythritol acrylate composed of tri-, tetra- and pentacrylate, which acrylic monomer has an hydroxyl group or an active hydrogen for reaction with the diisocyanate. Reaction of this pentaerythritol polyacrylate with diisocyanate, such as MDI, at different levels produces a stable liquid prepolymer, which does not react when added to an unsaturated polyester resin prior to the peroxide agent addition to the promoted unsaturated resin. For example, with a pentaerythritol triacrylate made up of tetra- and pentacrylate, the molecular weight of the acrylic monomer is 298 with a hydroxyl number of 298, which is reacted with MDI with 32% NCO and a 2.3 functionality with the MDI containing both 4—4 and 2-4 isomers.

Other high functionality hydroxyl acrylic monomers suitable for use would include ethoxylated or propoxylated trimethylol propane or glycerol polyacrylate, e.g., tri acrylate monomers. Specific high functionality acrylic monomers suitable for use include ethoxylated trimethylol propane triacrylate; pentaerythritol tri, tetra and penta-acrylate, propoxylated trimethylolpropane triacrylate; propoxylated glycerol triacrylate; di-tri methylol propane tetracrylate; dipentaerythritol pentacrylate; and ethoxylated pentaerythritol tetracrylate and combinations thereof.

The prepolymer is made by reacting with or without a catalyst the hydroxyl-containing acrylic monomer with polyisocyanate, more particularly, an aliphatic or aromatic diisocyanate, such as, but not limited to an aromatic diisocyanate, like MDI, or an aliphatic isocyanate, such as trimerized HDI (hexamethyl diisocyanate) or trimerized IPDI (isophenyl diisocyanates), or other acceptable diisocyantes or prepolymers which will react with the hydroxyl groups in the acrylic monomer. The compound, pentaerythritol triacrylate is a commercial product known as SR 444 of Sartomer Company, Inc. of Exton, Pennsylvania.

The prepolymer is added to an unsaturated resin composition, either alone or preferably in the concentrate form, known to contain some styrene monomer for viscosity control purposes, and thereby needing a reduction of the styrene monomer employed in the unsaturated polyester resin. The total amount of styrene monomer in the unsaturated resin composition would be less than 30% by weight. The prepolymer concentrate would also generally contain an inhibiting agent to provide for storage stability of the liquid concentrate, such as to maintain at least two-weeks' stability at 120° F., and which inhibitor generally comprises a quinone compound, such as parabenzoquinone.

The prepolymer concentrate is employed as an additive diluent to unsaturated polyester resin compositions, such as those unsaturated resin compositions, but not limited to, polyester resins prepared by reacting dicyclopentadiene (DCPD) with orthophthalic and maleic acid, the reaction of propylene glycol with maleic acid anhydride; and the reaction of isophthalic acid-maleic anhydride with neo pentyl glycol, or other known unsaturated polyester resin compositions.

Generally, the unsaturated resin compositions contain an inhibitor to prevent prereaction until a promoter or catalyst is added to effect cure in the polyester resin after the addition of the prepolymer concentrate. The unsaturated polyester resin compositions contain a monomer for cross linking therewith, such as a diluent styrene monomer at reduced levels, where a concentrate prepolymer is employed. A cure is effected by employing an organic peroxide compound, and typically a metal salt, such as a fatty acid salt, like a cobalt octoate or potassium octoate, is employed in combination with an organic ketone, such as methyl ethyl ketone peroxide, to provide for an exothermic curing reaction. The promoter and catalyst composition may also contain amide-type compounds for acceleration purposes, such as the dimethyl acetamide. Generally, the peroxide, metal salts, amines and amides are employed at low levels with the peroxide employed from about 0.1% to 2.5% by weight and the metal salts ranging from about 0.05% to 0.5% by weight and the amine or amide from about 0.05% to about 0.5% by weight. It has been found that after addition of the concentrate prepolymer to the unsaturated polyester resin composition used to prepare laminates, that the roll-out time was reduced, for example, to less than five minutes. The polyester resin composition without the concentrate prepolymer, even though such composition gelled in ten minutes, tended to stay rubbery for five minutes or more until a peak exotherm occurred, while with the use of the concentrate prepolymer, cure of the polyester resins to a rigid physical condition occurred in less than five minutes.

It has been found that the employment of the prepolymer concentrate of the invention helps in reducing roll-out where the unsaturated resin composition is employed with fiberglass, such as in a spray or mold operation, so that in the preparation of cured polyester fiberglass laminates with the use of the liquid concentrate prepolymer, no rolling of the concentrate was required when the concentrate was employed. Further, it has been noted that the polyester resin systems, with the liquid prepolymer concentrate added thereto, had little or no styrene monomer smell within three to four minutes after the spraying of the resin composition, which is believed to occur as a result of the cross linking taking place and tying up the styrene monomer.

The invention will be described for the purposes of illustration only in connection with certain embodiments; however, it is recognized that those persons skilled in the art may make various modifications, changes, additions and improvements to the illustrated embodiments, without departing from the spirit and scope of the invention.

EMBODIMENTS OF THE INVENTION

Example 1

A liquid concentrate prepolymer prepared by admixing together 500 parts per weight of pentaerythritol triacrylate (acrylate SR-444) and 100 parts per weight of MDI (Papi 94, a trademark of Dow Chemical Company) and slowly reacted together without the present of catalyst to provide a liquid pentaerythritol acrylic urethane. Four hundred parts per weight of a styrene monomer were added to the liquid prepolymer and together with 50 ppm of an inhibitor, parabenzoquinone. Employment of straight uretonominiisocyanate (like Dow L143) and polymeric MDI (like Papi 27) were also employed with the acrylate SR-444. Prepolymer solidification took place while heating the mixture in the oven. Low functionality hydroxyl-containing acrylic acrylates were tried employing diisocyanates of Papi-94 (Dow L143 and Papi 27); however, all these low functionality monomers solidified when the prepolymers were made.

Example 2

The liquid prepolymer concentrate was added to different types of unsaturated polyester resins, such as a general purpose orthophthalic resin containing 30% styrene monomer and NPG orthoresin containing 30% styrene monomer, an NPG isophthalic resin containing 30% styrene monomer and DCPD ortho resin blends containing 30% styrene monomer. The unsaturated resin composition contained 50 ppm of an hydroquinone inhibitor with the mixing in of the liquid prepolymer concentrate, catalysts and promoters were admixed as follows: 2% catalyst of methyl ethyl ketone peroxide (containing 9% oxygen); 0.2 parts per weight of 12% cobalt octoate as a promoter; 0.2 parts per weight of dimethyl acetyl acetamide (DMAA); and 0.1 parts per weight of potassium octoate (15%). Ten percent of the liquid prepolymer concentrate was added to each resin. Gel time without the concentrate was about 10 minutes, while with the concentrate added, gel time was reduced to 2.5 to 2.8 minutes. All samples prepared without the concentrate, even though they gelled in ten minutes, stayed rubbery for five minutes until a peak exotherm occurred, while the same polyester resin samples with the 10% liquid prepolymer concentrate became rigid in less than five minutes.

Example 3

The unsaturated polyester resin samples containing the 10% liquid prepolymer concentrate were put on a Binks B-8 fiberglass spray machine and sprayed with a Binks Century gun with external mix catalyst above and the fiberglass at about 22% by weight was sprayed at ¾ inch fiber length employing a four by four foot plate mold. With each unsaturated polyester resin system used without the liquid prepolymer concentrate on the surface, the glass required rolling to make an acceptable laminate without air. The liquid prepolymer concentrate added at 10% and sprayed provided for a fiberglass polyester cured laminate requiring no roll out. Further, the resin systems with the liquid concentrate had no styrene monomer smell within three to four minutes of spraying of the polyester resin as a result of cross linking taking place with the styrene monomer.

Physical testing was done on all the polyester resin compositions, with or without the liquid prepolymer concentrate as added at 10%, and the test results are shown on the accompanying Table II.

Example 4

Compression-molded fiberglass trays were prepared employing an isophthalic polyester resin with a heat-activated catalyst, such as tertiary butyl perbenzoate, and added to a 33% glass fiber mat, with mold temperatures at 280° F., a cycle time of 90 seconds and with 10% of the liquid prepolymer concentrate added to the polyester resin. Upon addition of the liquid prepolymer concentrate, cycle times for curing were reduced to 60 seconds. The glass fiber wet-out was improved, styrene emissions were reduced and the laminate had improved physical properties and chemical resistance.

Example 5

Further tests were carried out with other polyester resins with and without a styrene monomer added and to which 10% by weight of the liquid concentrate of Example 1 was added. The cycle times of the polyester resin increased to 10 to 12 minutes on all types of polyester resins, and when each polyester resin system was sprayed with the fiberglass, no improvement was seen over the same polyester resin without the presence of the liquid prepolymer concentrate of the invention.

| Urethane Oligomers |
| --- |
| Aliphatic urethane acrylate and 2-(2 Ethoxyethoxy) Ethyl acrylate ester (Craynor 961-H) |
| Epoxy acrylate Oligomers plus 1, 6 Hexanediol diacrylate ester (Craynor 120 B) |
| Aromatic urethane Oligomer plus 1, 6 Hexanediol diacrylate ester (Craynor 970) |

Example 6

In the marine and bathtub industry in the preparation of fiberglass laminate, water absorption is critical to the success of the end product. Extensive boiling tests were run on samples of polyester resins of DCPD, G.P.-Ortho, NPG-Ortho and NPG-Iso polyester resins, both with and without the liquid prepolymer concentrate added. The following Table III shows the percent water absorption at 80° C. for 160 hours.

TABLE III

| | Type Resin | | | | | | | |
| --- | --- | --- | --- | --- | --- | --- | --- | --- |
| | DCPD | DCPD + C* | PG | PG + C | NPG-Ortho | +C | NPG-ISO | + C |
| % H$_2$O Absorption | 3.2 | 1.6 | 3.1 | 1.4 | 2.9 | 1.4 | 2.0 | 1.2 |

*C = 10% concentrate made from SR-444.

The above results indicate that all unsaturated polyester resin compositions showed significant improvement in water absorption when the liquid prepolymer concentrate was added at a level of 10% parts by weight.

Thus, the modified prepolymer concentrate prepared by the employment of pentaerythritol triacrylate, MDI and a styrene monomer with an inhibitor when added to unsaturated polyester resin compositions results in improvement in the physical and chemical properties, such as decrease in cure time, reduction in styrene emissions, reduction in styrene odor when sprayed, reduction in roll-out of molded or sprayed laminates, reduction in water absorption, increased chemical resistance, higher heat distortion temperatures and higher impact strength.

The unsaturated polyester resin composition with the modified acrylic-urethane prepolymer or oligomer and with a styrene monomer of less than about 30% by weight may be cured with a methyl ethyl ketone peroxide (1.5%–2.0%) and a cobalt salt (0.1%–0.5%). The composition can be sprayed as a glass-fiber barrier coat behind a polyester or polyester-acrylic gel coat with a very fast cure time and with rapid cure. The barrier coat strengthens the gel coat and reduces water absorption and lowers water and vapor transmission. The composition may be sprayed or used with charged glass fibers in an open or closed mold, so that a no-roll surface without air entrapment can be prepared. After the gel coat is applied and a barrier coat is added (prior to resin and glass application), no glass fibers are visible on the gel coat side, eliminating veil mats, to provide a class A finish where a class A mold is used.

What is claimed is:

1. A liquid curable unsaturated polyester resin 2 composition of improved physical and chemical properties, which composition comprises:
   a) an unsaturated polyester resin containing ethylenic unsaturation and prepared by the reaction of a hydroxy acid and a dihydroxy alcohol;
   b) a styrene monomer in an amount of less than about 40% by weight of the composition;
   c) a liquid acrylic-urethane additive prepolymer prepared by the reaction of a diisocyanate in a stoichiometric or greater amount with a high functionality polyhydroxyl acrylate monomer;
   d) an inhibitor in an amount to retard the premature reaction of the prepolymer and the styrene monomer; and
   e) a peroxide catalyst in an amount to promote the curing of the styrene monomer, the polyester resin, and the acrylic-urethane prepolymer.

2. The composition of claim 1 wherein the prepolymer comprises from about 5% to 30% by weight of the composition.

3. The composition of claim 1 wherein the styrene monomer comprises less than about 30% by weight of the composition.

4. The composition of claim 1 wherein the inhibitor comprises a quinone compound.

5. The composition of claim 1 wherein the acrylate monomer comprises a poly hydroxy $C_2$–$C_6$ alkyl acrylate monomer.

6. The composition of claim 1 wherein the acrylate monomer comprises a pentaerythritol polyacrylate.

7. The composition of claim 1 wherein the acrylate monomer comprises an ethyoxylated or propoxylated polyacrylate monomer.

8. The composition of claim 1 wherein the diisocyanate comprises MDI or MDI urethane prepolymers.

9. The composition of claim 1 wherein the peroxide catalyst is in an amount of about 0.1% to 2.5% by weight of the composition.

10. The composition of claim 1 which includes a metal salt promoter in a cure promoting amount to provide an exothermic curing reaction.

11. The composition of claim 10 which includes an amino or amide accelerator in an amount to accelerate the curing reaction.

12. The composition of claim 1 which includes glass fiber or particulate filler material.

13. The composition of claim 1 wherein the composition is characterized by a sprayable liquid viscosity and includes up to 30% by weight of the composition of glass fibers to prepare a fiber-glass cured laminate.

14. The composition of claim 1 wherein the peroxide catalyst comprises a methyl ethyl ketone and includes a metal fatty acid promoter, and the acrylate monomer comprises a pentaerythritol triacrylate, and the diisocyanate comprises MDI.

15. The composition of claim 1 wherein the polyester resin composition comprises unsaturated polyester resin prepared by the reaction of dicyclopentadiene with a phthalic or maleic acid anhydride, propylene glycol with phthalic-maleic acid; anhydride and neopentyl glycol.

16. The composition of claim 13 characterized by a cure time and roll-out time of less than about five minutes.

17. The cured polyester resin composition of claim 1.

18. The cured polyester resin composition of claim 13.

* * * * *